United States Patent [19]

Montiglio et al.

[11] 3,911,095

[45] Oct. 7, 1975

[54] PREPARATION OF FERROMAGNETIC CHROMIUM DIOXIDE HAVING GRANULOMETRIC AND MAGNETIC CHARACTERISTICS VARYING WITHIN WIDE LIMITS AS WELL AS A NEW CHROMIUM DIOXIDE OF PARTICULAR GRANULOMETRIC CHARACTERISTICS

[75] Inventors: Ugo Montiglio; Giampiero Basile; Pierfrancesco Aspes, all of Alessandra; Luigi Foco, Spinetta Marengo, all of Italy

[73] Assignee: Montecatini Edison S.p.A., Milan, Italy

[22] Filed: June 28, 1973

[21] Appl. No.: 374,650

[30] Foreign Application Priority Data

June 30, 1972 Italy .................................. 26474/72
June 30, 1972 Italy .................................. 26475/72

[52] U.S. Cl. ............................... 423/607; 252/62.51
[51] Int. Cl.[2] ........................................ C01G 37/02
[58] Field of Search .................... 423/607; 252/62.51

[56] References Cited

UNITED STATES PATENTS

| | | | |
|---|---|---|---|
| 3,243,260 | 3/1966 | Kubota et al. | 423/607 |
| 3,278,263 | 10/1966 | Cox | 423/607 |
| 3,529,930 | 9/1970 | Bottjer et al. | 252/62.51 X |
| 3,575,689 | 4/1971 | Mihara et al. | 423/607 |
| 3,696,039 | 10/1972 | Rodi | 423/607 X |

*Primary Examiner*—Herbert T. Carter
*Attorney, Agent, or Firm*—Stevens, Davis, Miller & Mosher

[57] ABSTRACT

A process is disclosed for obtaining a ferromagnetic chromium dioxide having granulometric and magnetic characteristics varying within a very wide range, starting from hydrated chromium (III) chromate or from mixtures of metal chromium and chromium oxide having a valency greater than 4, by heating up to between 300° and 500°C under an oxygen pressure of 30–1000 atm., characterized in that the variations of the granulometry and of the magnetic characteristics are obtained by regulating the heating, by means external to the reaction mass or by adding to the starting materials from 0.05 to 30% by weight (with respect to the chromium present) of compounds that decompose exothermically between 100° and 270°C under reaction conditions that lead to $CrO_2$ by favoring the reduction to $CrO_2$ in such a way that the reaction mass will cross the temperature interval of from 200° to 300°C in pre-established times, depending on the granulometry and coercive force desired in the product. Suitable exothermically decomposing compounds include ammonia, oxalic acid, lactic acid, citric acid, and tartaric acid. A novel ferromagnetic chromium dioxide is also disclosed.

17 Claims, No Drawings

PREPARATION OF FERROMAGNETIC CHROMIUM DIOXIDE HAVING GRANULOMETRIC AND MAGNETIC CHARACTERISTICS VARYING WITHIN WIDE LIMITS AS WELL AS A NEW CHROMIUM DIOXIDE OF PARTICULAR GRANULOMETRIC CHARACTERISTICS

This invention relates to a method for preparing ferromagnetic chromium dioxide having high values of residual magnetization and of saturation magnetization, as well as coercive force values variable at will within wide limits. Moreover, it relates to a novel chromium dioxide.

More particularly, the invention relates to a method for preparing a ferro magnetic chromium dioxide whose coercive force and granulometric characteristics make it suited for the most varied applications, and it also relates to a novel chromium dioxide having particular granulometric characteristics that make it differ from all other known chromium dioxides.

It is well known that chromium dioxide, in the various fields of magnetic recording in which it is used, must always have the highest possible residual magnetization and saturation magnetization. However, and depending on the use for which it is intended, the required coercive force differs from case to case; thus, for instance, audio-recordings will require a coercive force between 280 and 320 Oersted, while video-recordings will require a coercive force of 400 and above. In many applications, very important also is the granulometry of the chromium dioxide: a very uniform granulometry is often an indispensable requisite for certain applications. On the other hand, the coercive force of the chromium dioxide, like that of any ferromagnetic material, depends on the particle sizes (which preferably shall be those of a single magnetic domain) and on the axial ratios between length and width.

A highly uniform granulometry is, moreover, required in the use of $CrO_2$ as oxidizing catalyst, for instance in the oxidation of $SO_2$ to $SO_3$ and of HCl to $Cl_2$.

The known chromium dioxides have highly variable magnetic and granulometric characteristics. Thus, for instance, there are known chromium dioxides consisting of large, roundish particles having a length that may attain 60 microns and over, which are made up of several magnetic domains (that is, by many elemental magnets combined in the same particle), and have a poor coercive force (from just a few Oersted to about a hundred Oersted) because of the interaction of the magnetic domains composing the particle itself. Such chromium dioxides have very little homogeneity so far as shape is concerned, and they are not used both because of their poor magnetic characteristics as well as because of their nonhomogeneity.

Moreover, chromium dioxides of excellent magnetic characteristics are known, which are formed by particles with one single magnetic domain (in which, that is, each particle behaves as one single elemental magnet), in which, however, the particle size is rather variable: e.g., length from 0.1 to 2 or 3 microns; length/width ratios between 2:1 and 20:1 and over.

On the other hand it is known that the coercive force value of the chromium dioxide, just like that of any other ferromagnetic material, depends mainly on the axial ratio between the length and the width of the particle, provided that the dimensions of the single magnetic domain are not exceeded.

It is thus evident that for obtaining a chromium dioxide of the desired coercive force it will be necessary to provide a process that shall be capable of regulating the granulometric characteristics and more precisely that it will enable one to obtain a distribution of the axial ratio and of the length of the particles, thereby obtaining products of a different coercive force.

Various processes are known for obtaining ferromagnetic chromium dioxide. Thus, for instance, in a previous patent of the same assignee (Italian Pat. No. 894,564) a method is described according to which a ferromagnetic chromium dioxide is obtained by reacting chromium (as such or passivated by heating at 200°–500°C, under a normal pressure in a nitrogen atmosphere) with chromium oxides with a valency of over 4, at temperatures between 300° and 500°C, under pressures between 5 and 300 atm.

Another patent application of the same assignee (Italian application No. 21316 A/71, now Italian Pat. No. 922,283, on the other hand, describes a particularly simple method of easy execution for obtaining ferromagnetic $CrO_2$. Said method consists in heating the hydrated chromium(III) chromate (of the formula: $Cr_2(CrO_4)_3.nH_2O$, with molar ratio $Cr^{6+}/Cr^{3+} = 1.5$, and where n may vary from 1 to 8) at a temperature of about 300°–400°C and under a pressure of 30–1000 atm. Thereby oblong particles are obtained which have a sufficiently uniform granulometry and a coercive force of up to about 350 Oersted.

One drawback that has been noted consists in the fact that it turns out to be rather difficult to obtain with these systems and with others known to those skilled in the art, the whole range of coercive forces and granulometric characteristics that would be desirable to have available in view of the various usages of the chromium dioxide.

The object of the present invention is, thus, to provide a process that will enable one to prepare pure chromium dioxide characterized by a coercive force variable within a wide range and by high values of residual saturation magnetization.

Another object of this invention is that of providing a process that will enable one to obtain chromium dioxide of a predetermined and uniform granulometry.

Still another object of this invention is that of providing a novel chromium dioxide of highly uniform granulometry and with a particle length below 0.1 micron.

All these and still other objects may be achieved with the process of this invention by heating a hydrated chromium(III) chromate of the general formula: $Cr_2(CrO_4)_3.nH_2O$ (wherein n may vary from 1 to 8, while the $Cr^{6+}/Cr^{3+}$ ratio may vary from 1.2 to 1.9, but preferably equals 1.5), or metal chromium (as such or passivated for instance by heating at 200°–500°C in air or nitrogen atmosphere) and chromium oxide of which the chromium has a valency above 4 (preferably $CrO_3$) at temperatures above 300°C, in general between 350° and 500°C, and under an oxygen pressure of 30–1000 atm., the heating being regulated in such a way that the reaction mass shall remain for a predetermined time within the temperature range of 200° and 300°C, both by acting with external means on the reaction mass as well as by adding to the starting products from 0.05% to 30% by weight (with respect to total chromium present in the starting material) of a substance that will oxidize under reaction conditions, favoring the reduction of the starting material to $CrO_2$ through an exothermic reaction that will be primed at a temperature between 100° and 270°C.

In fact, it has surprisingly been found that the length of the particles of the $CrO_2$ decreases inversely with respect to the time the reacting mass remains during the synthesis within the temperature range of 200° to 300°C; that the uniformity increases with the decreasing of the residence time up to obtaining very small and highly homogeneous particles; and that, within certain limits, also the coercive force grows and, having attained a maximum for relatively short residence times, thereafter decreases for very short residence times.

In fact, if one takes as an index of the granulometric uniformity the minimum and maximum length in microns of the chromium dioxide particles and the length/width ratio of 90% of the particles themselves, it will be noted that the products obtained by keeping the chromium(III) mass, of $Cr^{6+}/Cr^{3+}$ ratio equal to 1.5, under reaction for very short stretches of time - for instance of from 20 to 30 minutes - in the temperature interval between 200° and 300°C, there will be obtained an acicular chromium dioxide formed of crystals having a length varying between 0.08 and 0.6 $\mu$, with length/width ratios of 90% of the particles varying between 6:1 and 12:1.

The coercive force $H_c$ of the product turns out to be excellent and exceeds 400 Oersted.

By letting the reacting mass remain within the 200° to 300°C temperature range for slightly longer residence times, for instance 35 minutes, the chromium dioxide crystals obtained will turn out to be slightly longer (with lengths between 0.1 and 0.7 $\mu$), the length/width ratio of 90% of the particles will remain rather constant (between 6:1 and 12:1), and the coercive force will drop to around 390 Oersted.

With still longer residence times within the 200° to 300°C temperature range, for instance of 65 minutes, the length of the particles will vary between 0.1 and 1 $\mu$, the length/width ratio of 90% of the crystals will vary between 4:1 and 12:1 while the coercive force will be of only 290 Oersted.

However, as shown below by Example 5 (see Table 1), when the residence time of the reacting mass within the temperature range 200° to 300°C drops below 20 minutes, the coercive force of the $CrO_2$ obtained tends to be slightly reduced and the particles grow shorter and more homogeneous, as is shown by the length/width ratio of 90% of the particles and the length of 90% of the particles.

A similar result is obtained if one starts from the mixtures of metal chromium and $CrO_3$ described in the abovementioned Italian Pat. No. 894,564. If the reacting mass is kept for a residence time of more than 10 minutes, e.g. for 14 minutes, within the temperature interval of 200° to 300°C, one attains — as shown below by Example 7 — a coercive force of 340 Oersted. By keeping the reacting mass in the 200° to 300°C range for times that are longer (say 35 minutes), the coercive force will drop to 280 Oersted (see Example 6).

Thus, by suitably regulating the thermal heating diagram of the chromium(III) chromate and of the mixture Cr ÷ chromium oxide the chromium of which has valence higher than 4, it is possible to obtain — as will clearly appear from the examples given below — a chromium dioxide of a desired coercive force, and moreover one that will be perfectly reproducible.

It is thus possible to prepare a full range of products with variable coercive forces, in a continuous way, up to 400 Oersted and over, thus enabling one to select and use the product best suited for a specific use and best suited for the processing equipment.

The temperature range between 200° and 300°C corresponds to that of the formation of chromium dioxide; in fact, for instance in case the starting product were chromium(III) chromate, up to 200°C the product, subjected to a pressure of 30–1000 atm. of oxygen, would still turn out to be amorphous to the X-rays just like the untreated chromium(III) chromate; above 300°C, on the contrary there does not take place any further formation of $CrO_2$, not even by attaining 500°C, nor will an even prolonged heating between 300° and 500°C substantially modify the characteristics of the $CrO_2$ that has formed.

In order to cause the reacting mass to cross rapidly the 200° to 300°C temperature range, one may take advantage of several expedients per se quite well known to those skilled in the art, such as pre-heating the container up to 300°C and above before introducing the reactants, or by introducing the container into a preheated environment, or by heating it internally by means of a heating source such as, for instance, resistances, or heating coils in which circulate liquids at the desired temperature, so that the whole reacting mass is brought beyond the critical temperature, etc.

Still another method for obtaining the rapid crossing of the 200° to 300°C temperature range by the starting material is that of admixing with said starting material substances that decompose exothermically between 100° and 270°C thereby favoring the reduction to $CrO_2$. Under these conditions the temperature range of 200° to 300°C, within which the starting material is converted into $CrO_2$, is crossed by the material very rapidly, sometimes in less than 10 minutes, with the consequences already indicated.

The coercive force and the uniformity of the particles are so much the better the less time the reacting material remains within the 200° to 300°C temperature range, under an oxygen pressure of 30–1000 atm., up to a certain limit beyond which the coercive force will decrease and the granulometric uniformity will increase.

Amongst the substances that decompose and thereby favor the reduction to $CrO_2$ with an exothermic reaction, the following have proved particularly active: ammonia, oxalic acid, lactic acid, tartaric acid, citric acid. These substances cause a definite temperature jump within the critical zone of formation of the $CrO_2$, thereby bringing the reacting mass rapidly to exceed 300°C. This temperature jump depends not only on the quality, but also on the quantity of the substance used. In the case of ammonia acting on the chromium(III) chromate it will be noted, in fact, that an addition of 1.15% (calculated on the anhydrous salt) will cause a temperature jump at 243°C so that in only 7 minutes there will be attained a temperature of 293°C. With higher percentages of the added substance the jump will occur progressively below 243°C and will be greater. Thus, for instance, with 1.73% ammonia the temperature jump will occur at 235°C and in just 2 minutes and 40 seconds will reach 315°C.

As is shown by the examples below, it will be noted, moreover, that with a residence time within the 200° to 300°C temperature range of 55 minutes, in the presence of 0.87% of $NH_3$ (calculated on the starting anhydrous $Cr_2(CrO_4)_3$) one will obtain coercive forces of around 415 Oersted, while in the absence of $NH_3$ they would only be between 330 and 290 Oersted.

Under the synthesis conditions of $CrO_2$, oxalic acid will develop by its exothermic decomposition between 140° and 200°C, with the freeing of $CO_2$ (and hydrogen). Adding said oxalic acid, for instance, to the starting chromium chromate and by then heating in an autoclave under the reaction conditions necessary for obtaining the $CrO_2$, a sudden jump between 140° and 190°C will be experienced that will rapidly bring the temperature up to over 200°C, whereafter there will set in a temperature drop which, due to the heating effect, will then rise again.

Lactic, tartaric and citric acids act similarly under the same conditions, completely oxidizing to $CO_2$ and $H_2O$.

In carrying out the process of the present invention, it will also be noted that there are optimum quantities for each additive for obtaining magnetic characteristics exploitable in the fields of application in which high coercive forces are wanted; and it will also be noted that such quantities do not coincide with those that yield the most uniform granulometry, as will appear from the tables set forth below.

On the contrary, there has been found (and this is also an object of the present invention) a ferromagnetic chromium dioxide with an altogether peculiar granulometry, that is with particles of a length between 0.01 and 0.1 $\mu$, but often between 0.01 and 0.08 micron, a length/width ratio of the particles between 1:1 and 5:1, but preferably between 2:1 and 3.5:1; of coercive forces of between 320 and 220 Oersted; with a saturation magnetization of from 80 to 87 gauss cc/g, with residual magnetization/saturation magnetization ratios between 0.40 and 0.50.

The ferromagnetic chromium dioxide which is an object of this invention is obtained by using high additive concentrations. As has been previously mentioned, once the quantities that impart to the chromium dioxide very high coercive forces — probably to be explained by a combined action of crystallize anisotropy with shape anisotropy — have been exceeded, further additions will give a greater granulometric uniformity and a lower axial ratio. Thus, using as starting material hydrated chromium(III) chromate with a molar ratio $Cr^{6+}/Cr^{3+} = 1.5$, it will be noted — as shown by Table 4 below — that the maximum coercive force values are obtained by adding 1.15% by weight of $NH_3$, calculated on anhydrous $Cr_2(CrO_4)_3$. The previously described novel chromium dioxide, on the contrary, will be obtained when the quantities of ammonia reach 3.45%.

If instead of ammonia oxalic acid in solution is added (see Examples 21–27 below) there will have to be added 22.2% by weight of the oxalic acid in order to obtain a chromium dioxide with particles of a variable length between 0.03 and 0.08 microns, and length/width ratios between 1.5:1 and 3.5:1. The products with the highest coercive force, on the contrary, are obtained (see Example 25) by adding 5.55% by weight of oxalic acid in solution, in which case the particle length will vary from 0.1 to 0.6 and the length/width ratio will be between 4:1 and 20:1.

Chromium(III) chromates showing formulae slightly different from the theoretical one: $Cr_2(CrO_4)_3.nH_2O$ (in as much as they contain either an excess or a deficiency of hexavalent chromium, that is the $Cr^{6+}/Cr^{3+}$ molar ratio is different from 1.5) may serve just as well for preparing a wide range of ferromagnetic chromium dioxide products having a coercive force below 350 Oersted; the more one deviates from the value 1.5 of the molar ratio $Cr^{6+}/Cr^{3+}$, the lower will be the coercive force and the less uniform will be the granulometry. However, by maintaining constant the $Cr^{6+}/Cr^{3+}$ ratio (different from 1.5) in the starting chromium chromate, depending on the speed with which the reaction mass crosses the temperature range between 200° and 300°C and, thus, depending on the heating system or on the additives admixed with the starting material, it is possible to obtain a whole range of chromium dioxides with a coercive force and granulometric characteristics varying within a wide range.

The chromium(III) chromates with a $Cr^{6+}/Cr^{3+}$ ratio different from 1.5 are prepared in general by reducing an aqueous $CrO_3$ solution with an excess or a deficiency of reducing agent (methyl alcohol, formaldehyde) until obtaining the desired ratio, and by drying said solution under vacuum (as described in the aforesaid Italian application No. 21316 A/71).

The addition of the exothermically oxidizable compound to either the freshly prepared hydrated chromium(III) chromate or to the mixture of metal chromium and chromium oxide with valency greater than 4, is carried out either in an aqueous solution or in the dry state. The resulting mixture is then dried under vacuum, if necessary, and in this latter case, one determines on a sample the ammonia content or the content in oxalic acid or of the other added additives and, possibly, the $Cr^{6+}/Cr^{3+}$ ratio.

The determination of the characteristics of the products obtained were carried out in the following way:

by means of an X-ray diffractometer, in as much as the $CrO_2$ shows a characteristic diffraction spectrum whose main reflections, exploited for the quantitative and qualitative analyses, are:

| | | | |
|---|---|---|---|
| d = 3.11 A | relative intensity | = about | 100 |
| d = 1.63 A | " | " | 75 |
| d = 2.42 A | " | " | 60 |

through an electron microscope having, for instance, a magnifying power of 50,000 times, which will enable one to define dimensions, shape and granulometric distribution of the particles obtained;

by evaluation of the following magnetic characteristics: saturation magnetization ($\tau_s$), residual magnetization ($\tau_r$) and coercive force ($H_c$), the first two respectively expressed in electromagnetic units/g and the third expressed in Oersted.

Such magnetic characteristics have been determined by means of a vibrating sample magnetometer of the Foner type, capable of supplying a maximum range of 18,000 Oersted.

The following examples are given to better illustrate the inventive ideas underlying this invention.

EXAMPLE 1

The chromium(III) chromate to be used as a starting material for obtaining the $CrO_2$, was prepared in the following way:

4,000 g of $CrO_3$ were dissolved in distilled water, bringing the solution volume to 8 liters. This solution was then introduced into a 10-liter four-necked flask provided with a stirrer, a reflux cooler and a thermometer.

160 cc of $CH_3OH$ were then added dropwise and the whole was heated to boiling for about 6 hours, until thorough reaction of the alcohol which is converted to $CO_2$.

10 cc of the solution were withdrawn and on it was determined the $Cr^{6+}/Cr^{3+}$ ratio by means of iodometric titration of the hexavalent chromium, while the total chromium was determined after oxidation with $Na_2O_2$. The thus-determined ratio was equal to 1.5.

The solution was then dried in a spray drier of about 1 cubic meter capacity, where the following air temperature was 470°C and the outflowing air temperature 150°C.

A blackish-brown powder was obtained on which the $Cr^{6+}/Cr^{3+}$ ratio was once again determined, this ratio proving to be unchanged with respect to the value of 1.5 existing in the solution that was subjected to evaporation. The water content was 12.3%.

100 g of the hydrated chromium(III) chromate were introduced into a 130 ml titanium test tube. This container was then placed in an autoclave of the previously described type, made of stainless steel and having a holding capacity of 240 ml.

The autoclave was thereupon heated in a chamber with circulating hot gases that were heated by forcing them through an electrically-heated furnace.

By means of an oxygen bottle, at the beginning of the test a pressure of 100 atm. was created in the autoclave. This pressure in the autoclave rose then, during the heating, due to the oxygen generated by the reaction, to the water that was freed, and to the thermal gas expansion.

After 90 minutes the temperature inside the autoclave attained the temperature of 200°C that had been fixed as the lower limit of the critical reaction.

The temperature of 300°C, i.e., the upper limit of the critical reaction, was reached after 2 hours and 35 minutes, the residence time between 200°C and 300°C thus being 65 minutes.

After 3 hours and 10 minutes, a final temperature of 320°C was attained and maintained at this level for 3 hours. The final pressure amounted to 325 atm.

Thereupon the heating was stopped and, after cooling down, the pressure was released and the autoclave opened.

The black powder that had formed in the container was then ground in a ball mill, washed with water until the wash waters were limpid, and finally dried in an oven.

The X-ray diffraction pattern showed that the powder consisted entirely of $CrO_2$.

Under the electron microscope, the powder appeared to consist of oblong-shaped particles with the length varying from 0.1 to 1 micron and showing length/width ratios between 2:1 and 15:1. 90% of the particles have a length from 0.2 to 0.8 micron and the width/length ratio is between 4:1 to 12:1.

The magnetic characteristics proved to be the following:

coercive force $H_c$ = 290 Oersted
saturation magnetization $\sigma_s$ = 87.2 gauss cc/g
residual magnetization/saturation magnetization ratio: $\tau_r/\tau_s$ = 0.42.

EXAMPLES 2 – 5

The following examples illustrate the variations of both the coercive force and the granulometric characteristics that are obtained when the residence time within the 200° – 300°C temperature range is progressively reduced.

These examples employ the same hydrated chromium (III) chromate as prepared in Example 1 and by following the same procedures for the conversion to $CrO_2$; the only variation consists in the fact that, once a temperature of 200°C is attained, hot gases are made to lap the outside of the autoclave so as to reduce the residence time within the critical reaction range.

The final temperature, in any case, was 320°C and the product was maintained at this temperature for 3 hours. The final pressure was about 330 atm.

Table 1 reports all the data relevant to Examples Nos. 2 to 5 compared with those of Example 1.

TABLE 1

| Ex. no. | min. | l | r | l-90% | r-90% | $H_c$ | $\tau_s$ | $\tau_r/\tau_s$ |
|---|---|---|---|---|---|---|---|---|
| 1 | 65 | 0.1–1 | 2–15 | 0.2–0.8 | 4–12 | 290 | 87.2 | 0.42 |
| 2 | 45 | 0.1–0.8 | 3–20 | 0.25–0.7 | 5–12 | 330 | 87.7 | 0.45 |
| 3 | 35 | 0.1–0.7 | 4–15 | 0.2–0.5 | 6–12 | 390 | 88.1 | 0.46 |
| 4 | 25 | 0.08–0.6 | 4–20 | 0.18–0.4 | 6–12 | 400 | 87.4 | 0.52 |
| 5 | 18 | 0.08–0.45 | 3–15 | 0.15–0.35 | 5–10 | 370 | 86.8 | 0.45 |

$t$ = residence time within 200° to 300°C temperature range $l$ = minimum and maximum particle length (in microns)

$r$ = length/width maximum and minimum ratio of the particles $l$-90% = maximum and minimum length in microns of 90% of the particles $r$-90% = maximum and minimum length/width ratio of 90% of the particles $H_c$ = coercive force in Oersted.

$\tau_s$ = saturation magnetization, in gauss cc/g $\tau_r/\tau_s$ = residual magnetization/saturation magnetization ratio.

EXAMPLES 6 and 7

The following two examples are given to illustrate the effect of the rapid crossing of the 200° – 300°C temperature range in the synthesis of $CrO_2$ starting from metal chromium and $CrO_3$.

The metal chromium was prepared by reduction of $K_2[CrCl_5(H_2O)]$ with magnesium powder heated to red heat. The metal chromium thus obtained was washed with diluted boiling $HNO_3$ and then dried.

4.9 g of said metal chromium were mixed together in a test tube with 30.8 g of powdered $CrO_3$. After admixture with 13.5 ml of distilled water, the whole was placed into an autoclave, in which an oxygen pressure of 55 atm. was created.

The autoclave was then heated in a muffle oven set to a temperature of 400°C. After 2 hours, inside the autoclave a final temperature of 340°C and a pressure of 350 atm. were attained and maintained for 60 minutes.

The product thus obtained, after cooling down under oxygen pressure, grinding and washing, was examined under X-rays and proved to be formed entirely of $CrO_2$.

The magnetic and crystallographic characteristics of the product are recorded in the following Table 2 under Example 6 and represent the comparison standard.

If under otherwise the same conditions (same amounts of reactants, same pressure, etc.) but when the inside temperature reaches 200°C, hot gases are caused to lap the outside of the autoclave so as to reduce the residence time in the critical reaction region, and if, after having reached a final temperature of 340°C, such final temperature and a pressure of 350 atm. are maintained for 60 minutes, as previously described, a product is obtained having the characteristics reported below in Table 2 under Example 7.

TABLE 2

| Ex. no. | t min. | l $\mu$ | r | l-90% | r-90% | $H_c$ | $\tau_s$ | $\tau_r/\tau_s$ |
|---|---|---|---|---|---|---|---|---|
| 6 | 35' | 0.06 – 0.5 | 2–18 | 0.08 – 0.35 | 2–8 | 280 | 85.3 | 0.42 |
| 7 | 14' | 0.05 –0.35 | 2.5–12 | 0.08 – 0.25 | 3–8 | 340 | 85 | 0.45 |

The symbols are the same as those of Table 1.

EXAMPLES 8 – 11

The following examples show the effects of reducing or shortening the residence time of the reacting mass at temperatures between 200° and 300°C on the characteristics of the $CrO_2$ obtained, when starting from hydrated chromium(III) chromate having a $Cr^{6+}/Cr^{3+}$ molar ratio other than 1.5.

The chromium(III) chromates having molar ratios different from 1.5 (respectively 1.86 and 1.23) were prepared as described hereinbefore.

The reaction conditions were the same as those in Examples 1 – 5. If the residence times at temperatures between 200° and 300°C are shortened as reported below in Table 3, the characteristics of the $CrO_2$ thus obtained will prove to be improved with respect to the comparative tests.

TABLE 3

| Ex. no. | R | t min. | l | r | l-90% | r-90% | $H_c$ | $\tau_r$ | $\tau_r/\tau_s$ |
|---|---|---|---|---|---|---|---|---|---|
| 8 | 1.86 | 70' | 0.1 – 5 | 1–8 | 0.1 – 3 | 2 – 4 | 100 | 83.4 | 0.25 |
| 9 | 1.86 | 23' | 0.5–0.8 | 1–12 | 0.1 – 2 | 2 – 4 | 125 | 85.2 | 0.28 |
| 10 | 1.23 | 65' | 0.2–0.8 | 2.5–8 | 0.3 – 1 | 3 – 5 | 230 | 87.2 | 0.32 |
| 11 | 1.23 | 23' | 0.2–0.8 | 2.5–8 | 0.3–0.5 | 3 – 5 | 270 | 85.4 | 0.39 |

The symbols have the same meaning as those of Tables 2 & 3, except that here R represents the $Cr^{6+}/Cr^{3+}$ molar ratio of the starting hydrated chromium(III) chromate.

EXAMPLES 12 – 20

The following examples illustrate the effects of admixing ammonia with the hydrated chromium(III) chromate, at a molar ratio of $Cr^{6+}/Cr^{3+} = 1.5$, on the characteristics of the end product.

The chromium(III) chromate was prepared as in Example 1. Thereupon a measured molar quantity of an aqueous solution of $NH_4OH$, so as to attain the percentage of ammonia indicated below in Table 4, was employed as additive.

The solution was then dried in a dryer under vacuum at 130°C for 24 hours. The $Cr^{6+}/Cr^{3+}$ ratio was again determined and it was unvaried showing a value of 1.5, while also the content in $NH_3$ and in water were determined.

Table 4 below records the percentages of ammonia and of hydration water used in the various examples, as well as the temperatures at which the sudden temperature rise due to the presence of ammonia starts and stops, the duration of the thermal increase, the residence time within the 200°–300°C temperature range, the final pressure, and the characteristics of the products obtained.

It was also noted that below certain particle lengths the coercive force decreases (see Examples 16–20), while the granulometric uniformity increases. With high quantities of ammonia (see Example 20) the new chromium described hereinbefore was obtained.

TABLE 4

| Ex. no. | $NH_3$ | $H_2O$ | T.i. °C | T.f. °C | $t_i$ min. | $t_\mu$ min. | P atm. | l in $\mu$ | r | l-90% $\mu$ | r-90% $\mu$ | $H_c$ Oer. | $\delta_s$ gauss cc/g | $\delta_r/\delta_s$ |
|---|---|---|---|---|---|---|---|---|---|---|---|---|---|---|
| 12 | 0.57 | 12.1 | 248 | 270 | 10' | 60' | 355 | 0.1–0.8 | 3–20 | 0.15–0.7 | 4–12 | 360 | 86.2 | 0.48 |
| 13 | 0.87 | 12.5 | 246 | 276 | 8' | 55' | 357 | 0.1–0.8 | 3–20 | 0.15–0.6 | 5–15 | 415 | 87.3 | 0.55 |
| 14 | 1.15 | 12.2 | 243 | 293 | 7'10'' | 35' | 350 | 0.1–0.6 | 4–20 | 0.15–0.5 | 6–15 | 425 | 86.0 | 0.54 |
| 15 | 1.44 | 11.3 | 241 | 305 | 4' | 25' | 330 | 0.08–0.5 | 4–12 | 0.1–0.4 | 5–10 | 410 | 86.2 | 0.50 |
| 16 | 1.73 | 12.0 | 235 | 315 | 2'40'' | 10' | 370 | 0.06–0.4 | 3–12 | 0.1–0.3 | 4–8 | 395 | 87.1 | 0.47 |
| 17 | 2.01 | 12.3 | 226 | 322 | 2' | 7'40'' | 355 | 0.05–0.2 | 2.5–8 | 0.07–0.16 | 3–7 | 365 | 85.1 | 0.50 |
| 18 | 2.30 | 11.1 | 217 | 329 | 1'50'' | 4'30'' | 360 | 0.05–0.18 | 2.5–7 | 0.07–0.14 | 3–6 | 335 | 84.7 | 0.45 |
| 19 | 2.88 | 11.4 | 210 | 340 | 1'40'' | 2'50'' | 370 | 0.05–0.12 | 3–6 | 0.06–0.1 | 3.5–5 | 300 | 85.3 | 0.44 |
| 20 | 3.45 | 10.7 | 200 | 360 | 1'40'' | 1'20'' | 380 | 0.03–0.1 | 2–5 | 0.04–0.08 | 2.5–4 | 280 | 84.1 | 0.41 |

NOTE to Table 4

$NH_3$ = percentage of $NH_3$, calculated as a percent by weight of $NH_3$ on anhydrous $Cr_2(CrO_4)_3$.

$H_2O$ = percent by weight of $H_2O$ in the hydrated chromium(III) chromate additioned with ammonia.

T.i. = temperature at which the temperature increase in the reaction mass starts.

T.f. = final temperature attained at the end of the temperature increase.

$t_i$ = time taken by the reacting mass in order to pass from the temperature at which the temperature increase starts to the temperature at which the increase stops.

$t_p$ = residence time at temperatures between 200° and 300°C.

P = final pressure.

$l$ = minimum and maximum lengths (in microns) of the particles.

$r$ = length/width maximum and minimum ratio of the particles.

so obtained was made to react (after a quantity check of $(COOH)_2$ and the control of the $Cr^{6+}/Cr^{3+}$ ratio) under the conditions described for obtaining $CrO_2$. Here also the weight ratio of chromium chromate/oxalic acid is given in terms of the percentage by weight of the oxalic acid based on the anhydrous chromium salt.

During the reaction that leads to the $CrO_2$, it was noted that the spontaneous temperature increase, due to the exothermic decomposition reaction of the oxalic acid, starts at a lower level in comparison with the runs with $NH_3$, and that, moreover, once the maximum point has been reached, the temperature will again drop, to then rise again following the external heating.

As shown in Example 27, the new chromium dioxide like that of Example 20 may also be obtained with heavy quantities of oxalic acid.

TABLE 5

| Ex. no. | addition | $(COOH)_2$ | T.i. °C | T.f. °C | $t_i$ min. | P atm. | l μ | r | l-90% μ | r-90% μ | $H_c$ Oer. | $\delta_s$ gauss cc/g | $\delta_r/\delta_s$ |
|---|---|---|---|---|---|---|---|---|---|---|---|---|---|
| 21 | Dry | 6.95 | 145 | 180 | 5' | 355 | 0.06–0.7 | 3–20 | 0.15–0.4 | 4–15 | 380 | 85.1 | 0.50 |
| 22 | " | 13.9 | 140 | 195 | 4' | 370 | 0.06–0.6 | 3–15 | 0.1–0.4 | 3–12 | 350 | 86.4 | 0.47 |
| 23 | " | 27.8 | 140 | 275 | 3' | 380 | 0.04–0.3 | 3–10 | 0.06–0.15 | 2.5–7 | 330 | 83.9 | 0.45 |
| 24 | " | 44.4 | 140 | 293 | 3' | 385 | 0.03–0.16 | 3–10 | 0.05–0.12 | 5–6 | 300 | 84.3 | 0.42 |
| 25 | Wet | 5.55 | 180 | 215 | 3' | 360 | 0.1–0.6 | 4–20 | 0.15–0.4 | 5–15 | 410 | 87.3 | 0.48 |
| 26 | " | 11.1 | 185 | 225 | 3'30" | 375 | 0.05–0.3 | 2.5–8 | 0.04–0.07 | 3–6 | 345 | 84.2 | 0.42 |
| 27 | " | 22.2 | 194 | 233 | 3' | 380 | 0.03–0.08 | 1.5–5 | 0.04–0.07 | 2.3–5 | 270 | 86.4 | 0.45 |

The symbols used are the same as those of Table 4.

$l$-90% = minimum and maximum length of 90% of particles.

$r$-90% = minimum and maximum length/width ratio of 90% of the particles.

$H_c$ = intrinsic coercive force in Oersted.

$\sigma_s$ = saturation magnetization, gauss cc/g $\sigma_r/\sigma_s$ = residual magnetization/saturation magnetization ratio.

EXAMPLES 21 – 27

This set of examples illustrate the action of oxalic acid on the chromium chromate.

In Examples 21–24 the addition was carried out in the following way: to 100 g of hydrated chromium(III) chromate with a $Cr^{6+}/Cr^{3+}$ ratio equal to 1.5, and obtained according to Example 1, and containing 12.3% of water, there was added the percentage by weight of solid dry oxalic acid indicated in Table 5 [calculated on the anhydrous $Cr_2(CrO_4)_3$]. The mixture was then homogenized in an agate mortar and then made to react according to the procedures described above for obtaining $CrO_2$.

EXAMPLES 28 – 31

To three 100 g samples of hydrated chromium chromate, obtained according to Example 1 and containing 12% of water, there were admixed following the dry process, according to the method described in the preceding examples concerning the dry addition of oxalic acid, the following substances:

| | |
|---|---|
| lactic acid | = 1.5 g |
| lactic acid | = 10 g |
| monohydrated citric acid | = 6.95 g |
| tartaric (+) acid | = 8.48 g |

The procedure was then the same as that described above for the preparation of $CrO_2$ from chromium(III) chromate in the presence of oxalic acid. The results thus obtained are shown below in Table 6.

In the case of Example 29 in which the starting chromium(III) chromate was reacted with 10% by weight of lactic acid, the new chromium dioxide was obtained with a particle length of less than 0.1μ and with a length/width ratio of 90% of the particles between 1.5:1 and 4:1.

TABLE 6

| Ex. no. | | T.i. °C | T.f. °C | $t_i$ min. | P atm. | l μ | r | l-90% μ | r-90% μ | $H_c$ Oer. | $\delta_s$ gauss cc/g | $\delta_r/\delta_s$ |
|---|---|---|---|---|---|---|---|---|---|---|---|---|
| 28 | lactic acid 1.5 g | 160 | 210 | 10' | 350 | 0.08–0.35 | 2.5–8 | 0.12–0.3 | 3–6 | 340 | 83.3 | 0.46 |
| 29 | lactic acid 10 g | 113 | 330 | 1'10" | 355 | 0.02–0.09 | 1.5 | 0.03–0.08 | 1.5–4 | 240 | 82.4 | 0.42 |
| 30 | citric acid | 225 | 322 | 2'40" | 350 | 0.08–0.3 | 3.5–15 | 0.1–0.25 | 4–12 | 380 | 87.4 | 0.48 |
| 31 | tartaric acid | 135 | 375 | 1'10" | 345 | 0.05–0.25 | 3–8 | 0.1–0.2 | 3–6 | 330 | 84.1 | 0.43 |

In Examples 25–27 the following method was employed: to the chromium(III) chromate solution obtained according to Example 1, and having the above-indicated characteristics, varying quantities of a saturated aqueous oxalic acid solution were admixed therewith. The resulting solution was then dried in a drier under vacuum at 130°C for 24 hours, and the powder

EXAMPLES 32 – 34

This set of examples serves to illustrate the activity of ammonia during the reaction between metal chromium and $CrO_3$ according to Italian Pat. No. 894,564:

The metal chromium was prepared by reduction with magnesium powder at red head of $K_2[CrCl_5(H_2O)]$ and by a subsequent washing at the boiling point with diluted $HNO_3$ and final drying.

4.9 g of this metal chromium were then admixed in a test tube with 30.8 g of $CrO_3$ powder and then 13.5 ml of distilled water were added. Thereupon the whole mixture was placed into the autoclave in which an oxygen pressure of 55 atm. was created. The autoclave was then heated in a muffle oven at a stabilized heat of 400°C.

After 2 hours, inside the autoclave the final temperature attained 340°C and a pressure of 350 atm. which were maintained for 60 minutes. The product thus obtained, after cooling down under oxygen pressure, grinding and repeated washings, showed the characteristics reported in Table 6 under Example 32.

Adding to the starting products ammonia solutions, instead of water, so that these products will contain respectively 3% by weight and 4.5% by weight of ammonia on the total chromium ($Cr+CrO_3$), the heating conditions and the characteristics of the product obtained are as shown in Table 7 for Examples 33 and 34.

With heavy quantities of ammonia, as shown in Example 34, it is thus possible to obtain the new chromium dioxide also by starting from mixtures of metal chromium and $CrO_3$.

TABLE 7

| Ex. no. | $NH_3$ | T.i. °C | T.f. °C | $t_i$ min. | $t_p$ min. | P atm. | l in microns | r | l-90% in μ | r-90% in μ | $H_c$ Oer. | $\delta_s$ gauss cc/g | $\delta_r/\delta_s$ |
|---|---|---|---|---|---|---|---|---|---|---|---|---|---|
| 32 | — | 240 | 278 | 3'20" | 35' | 350 | 0.1–0.6 | 2–18 | 0.10–0.45 | 2–8 | 280 | 85.3 | 0.42 |
| 33 | 3 | 212 | 330 | 1'40" | 3'20" | 355 | 0.03–0.15 | 2.5–6 | 0.04–0.1 | 3–5 | 290 | 84.2 | 0.46 |
| 34 | 4.5 | 210 | 335 | 1'20" | 3' | 350 | 0.03–0.09 | 2–5 | 0.03–0.07 | 2.5–5 | 260 | 83.6 | 0.45 |

EXAMPLES 35 – 38

This set of examples serves to illustrate the variations of coercive force and of the granulometric characteristics that are obtained when the $Cr^{6+}/Cr^{3+}$ ratio of the hydrated chromium(III) chromate is different from the ideal value of 1.5.

The hydrated chromium(III) chromate containing an excess or a deficiency of hexavalent chromium is obtained as described above in Example 1, but using, however, a quantity of $CH_3OH$ lower or respectively higher than indicated in Example 1, so as to obtain, after reduction, the desired $Cr^{6+}/Cr^{3+}$ ratio.

Table 8 records the $Cr^{6+}/Cr^{3+}$ ratios used (R), the percentage of added ammonia, the residence times within the 200° – 300°C range, and the characteristics of the resulting products.

TABLE 8

| Ex. no. | R | $NH_3$ | t min. | l μ | r | l-90% μ | r-90% μ | $H_c$ Oer. | $\delta_s$ | $\delta_r/\delta_s$ |
|---|---|---|---|---|---|---|---|---|---|---|
| 35 | 1.86 | — | 70' | 0.1–5 | 1–8 | 0.2–3 | 2–4 | 100 | 83.4 | 0.25 |
| 36 | 1.23 | — | 65' | 0.2–0.8 | 2.5–8 | 0.3–0.6 | 3–5 | 230 | 87.2 | 0.32 |
| 37 | 1.7 | 1.5 | 55' | 0.12–1.5 | 1.5–20 | 0.2–0.8 | 2–15 | 310 | 84.0 | 0.39 |
| 38 | 1.3 | 1.5 | 60' | 0.08–0.4 | 2–6 | 0.1–0.3 | 3–5 | 300 | 86.1 | 0.42 |

What is claimed is:

1. In a process for the preparation of ferromagnetic chromium dioxide by heating at 300° – 500°C under an oxygen pressure of 30 – 1000atm. a starting material selected from the group consisting of:

a. a chromium (III) chromate $Cr_2(CrO_4)_3.nH_2O$ wherein the $Cr^{6+}Cr^{3+}$ molar ratio is between 1.2 and 1.9 and n is between 1 and 8; and b. a mixture of chromium metal as such or passivated, with a chromium oxide with a valency above 4; the improvement consisting in regulating the heating of said starting material in such a way that the residence time of said starting material within the 200° – 300°C temperature range is between 20 and 35 minutes when using starting material (a) and is longer than 10 minutes but no longer than 35 minutes when using starting material (b).

2. The process of claim 1 wherein the chromium (III) chromate has a $Cr^{6+}/Cr^{3+}$ molar ratio between 1.2 and 1.8.

3. The process of claim 1 wherein the chromium (III) chromate has a $Cr^{6+}/Cr^{3+}$ molar ratio of 1.5.

4. The process of claim 1 wherein the passivated chromium metal is obtained by heating chromium metal at 200° – 500°C in an air or nitrogen atomsphere.

5. The process of claim 1 wherein the chromium oxide with a valency above 4 is $CrO_3$.

6. The process of claim 1 wherein the residence time of the starting material (a) within the 200° – 300°C temperature range is between 20 and 30 minutes.

7. In a process for the preparation of ferromagnetic chromium dioxide by heating at 300° – 500°C under an oxygen pressure of 30 – 1000 atm. a starting material selected from the group consisting of:

a. a chromium (III) chromate $Cr_2(CrO_4)_3.nH_2O$ wherein the $Cr^{6+}/Cr^{3+}$ molar ratio is between 1.2 and 1.9 and *n* is between 1 and 8; and b. a mixture of chromium metal as such or passivated, with a chromium oxide with a valency above 4: the improvement consisting in admixing with said starting material from 0.05 to 30% b.w. with respect to the chromium present in the starting material of a member selected from the group consisting of ammonia, oxalic acid, lactic acid, tartaric acid and citric acid, said group member being oxidised under the existing reaction conditions, thereby favoring the reduction of the starting material to $CrO_2$ through an exothermic reaction that is primed between 100° and 270°C.

8. The process of claim 7 wherein the said group member is ammonia.

9. The process of claim 7 wherein the said group member is oxalic acid.

10. The process of claim 7 wherein the said group member is lactic acid.

11. The process of claim 8 wherein the starting material is chromium chromate $Cr_2(CrO_4)_3.nH_2O$ and the quantity of $NH_3$ is between 0.87 and 1.73% b.w. calculated with respect to anhydrous chromium (III) chromate.

12. The process of claim 9 wherein the starting material is chromium chromate $Cr_2(CrO_4)_3.nH_2O$ and the quantity of oxalic acid is between 5.55 and 22.2% b.w. calculated with respect to anhydrous chromium (III) chromate.

13. The process of claim 7 wherein the chromium (III) chromate has a $Cr^{6+}/Cr^{3+}$ molar ratio comprised between 1.2 and 1.8.

14. The process of claim 13 wherein the chromium (III) chromate has a $Cr^{6+}/Cr^{3+}$ molar ratio of 1.5.

15. The process of claim 7 wherein the passivated chromium metal is obtained by heating chromium metal at 200° – 500°C in an air or oxygen atmosphere.

16. The process of claim 7 wherein the chromium oxide with a valency above 4 is $CrO_3$.

17. A process according to claim 7, characterized in that, in order to obtain a chromium dioxide with a particle length between 0.01 and 0.1 micron, a length/width ratio between 1:1 and 5:1 and a coercive force of up to 300 Oersted, the starting chromium (III) chromate with molar ratio $Cr^{6+}/Cr^{3+} = 1.5$ is additioned with from 3 to 5% by weight of ammonia (with respect to the anhydrous chromium (III) chromate); or with from 10 to 35% by weight of oxalic acid; or with from 8 to 15% by weight of lactic acid.

* * * * *